United States Patent [19]

Fukushima et al.

[11] Patent Number: 4,945,215
[45] Date of Patent: Jul. 31, 1990

[54] OPTICAL RECORDING CARD HAVING HOLOGRAM CONTAINED THEREIN AND METHOD OF PRODUCING THE SAME

[75] Inventors: Yoichi Fukushima; Minoru Fujita; Yuji Kakinuma; Toshio Haga, all of Tokyo, Japan

[73] Assignee: Kyodo Printing Co., Ltd., Tokyo, Japan

[21] Appl. No.: 108,473

[22] Filed: Oct. 14, 1987

[30] Foreign Application Priority Data

Oct. 15, 1986 [JP] Japan .................................. 61-244995
Oct. 24, 1986 [JP] Japan .......................... 61-163468[U]

[51] Int. Cl.$^5$ .............................................. G06K 7/10
[52] U.S. Cl. ..................................... 235/457; 235/488
[58] Field of Search ............... 235/457, 458, 487, 488, 235/492

[56] References Cited

U.S. PATENT DOCUMENTS

| | | | |
|---|---|---|---|
| 4,376,887 | 3/1983 | Greenaway et al. | 235/457 X |
| 4,400,616 | 8/1983 | Chevillat et al. | 235/457 X |
| 4,464,566 | 8/1984 | Silverman et al. | 235/457 X |
| 4,542,288 | 9/1985 | Drexler | 235/488 X |
| 4,544,836 | 10/1985 | Galvin et al. | 235/488 X |
| 4,641,017 | 2/1987 | Zopata | 235/457 |
| 4,663,518 | 5/1987 | Borror et al. | 235/487 |
| 4,677,285 | 6/1987 | Taniguchi | 235/457 X |
| 4,684,795 | 8/1987 | Colgate, Jr. | 235/457 |
| 4,761,543 | 8/1988 | Hayden | 235/457 |
| 4,794,237 | 12/1988 | Ferrante | 235/457 |

Primary Examiner—William M. Shoop, Jr.
Assistant Examiner—A. Jonathan Wysocki
Attorney, Agent, or Firm—Martin A. Farber

[57] ABSTRACT

The present invention is concerned with a certification card such as ID card or the like including hologram and an optical recording portion.

Hologram is such that an amplitude and a phase of light wave emitted from an object are recorded and an image of the object is rebuilt by emitting light to reproduce of an amplitude and a phase of the thus emitted light.

On the other hand, optical recording technique is such that data pits are formed on an optical reflective surface of an optical recording layer and the thus formed data pits are detected by difference in optical reflectivity from the data pits when the object is lightened by laser beam so that data are read.

According to the present invention a card is constituted by adhering a card front board to a card rear board, and hologram and optical recording portion are formed between the card front board and the card rear board.

The such prepared certification card is difficult to be falsified and altered and therefore it has high safety.

11 Claims, 5 Drawing Sheets

OPTICAL RECORDING CARD HAVING HOLOGRAM CONTAINED THEREIN AND METHOD OF PRODUCING THE SAME

BACKGROUND OF THE INVENTION

1. FIELD OF THE INVENTION

The present invention relates to a certification card and more particularly to an optical recording card having hologram contained therein.

In recent years cards having a variety of information recorded have been widely used as ID card, cash card, bank card or the like.

2. BACKGROUND OF THE PRIOR ART

This kind of card is required to record vairous informations such as individual's data and issuance company's data. In the eariler age such information are recorded in the form of visual characters and symbols and in the later age they are recorded in the form of electrical signals using magnetism. However, there is a need of taking counteractions against prevention an occuurence of alteration and increased amount of informations.

Accordingly, in the latest years optical recording cards to which an optical recording technique is applied is developed. These optical recording cards have information recording medium each of which includes an optical reflective surface.

Such a card is called as optical recording card. Such a card is typically constructed in such a manner that a card front board and a rear board made of plastic material are adhered to one another and an optical recording layer is interposed therein. The optical recording layer is so constructed that its optical reflective surface has an optical reflective layer and the optical reflective surface is formed with various pits and the pits are detected by difference in optical reflectivity from the data pits in the presence of laser beams so that data contained therein are read.

On the other hand, utilization of hologram for cirtification card is already proposed (refer to, for instance, official gazette of Japanese Laying-Open of application No. 6782/1986 and official gazette of Japanese Laying-Open of application No. 176969/1986). Hologram is such that informations concerning amplitude and phase of light wave from an object is recorded simultaneously. When the hologram is exposed to light again, light wave having the same amplitude and phase as those of light from the original object can be reproduced and thereby a three-dimensional image can be reproduced. This phenomenon can be applied to a certification card whereby an appearance of the card can be improved, informations contained in the card has a highly increased density and it can be expected that falsification and alteration of the card are achieved only with much difficulties. In particular, due to the fact that a technique for producing hologram by press operation on transparent board has been developed, it becomes possible to carry out mass production of hologram and moreover utilization of hologram can be easily achieved.

Accordingly, since a certification card is provided with both optical recording portion and hologram portion, it is assured that an amount of informations to be contained in a card has a highly increased density and falsification and alteration of the card is achieved only with much difficulties However, if the optical card and hologram portion are prepared separately and they are attached to the card, the result is that the card becomes complicated in structure, the number of components and required man-hours increase in a simple additive manner and therefore the card is produced at an expensive cost.

SUMMARY OF THE INVENTION

The present invention has been made with the foregoing background in mind and its object resides in providing an inexpensive certification card having an optical recording portion and a hologram portion contained therein wherein it has high dense recording, increased difficulty of falsification and alteration, simple structure and reduced number of componets and required man-hours as well as a method of producing the aforesaid certification card.

To accomplish the above object there is provided in accordance one aspect of the present invention an optical recording card having hologram contained therein of the type including a card front board and a card rear board which are adhered to one another, wherein the card front board is constituted by transparent material and hologram and an optical recording portion are formed between the card front board and the card rear board.

Further, there is provided in accordance with other aspect of the invention an optical recording card having hologram contained therein comprising a transparent card front board of which inside surface includes a hologram portion building area and an optical recording portion building area, said hologram portion building area being formed with a pattern of convexity and concavity in the form of interference fringe of hologram, a reflective metallic film covering the pattern of convexity and concavity, an optical recording pattern layer comprising a reflective metallic film for covering the optical recording portion building area and a card rear board adapted to be adhered to the card front board from the above of the reflective metallic film and the optical recording pattern layer.

Further, there is provided in accordance with another aspect of the present invention a method of producing an optical recording card having hologram contained therein, comprising the steps of die pressing a pattern of concavity and convexity in the form of interference fringe in a hologram portion building area on a transparent card front board of which inside surface including the hologram portion building area and the optical recording building area.

forming a reflective metallic film over the hologram portion building area and the optical recording portion building area after completion of the step of die pressing, simultaneously patterning the reflective metallic film at the hologram portion building area and the optical recording portion building area in accordance with an optical recording pattern after completion of the step of forming the reflective metallic film, adhering a card rear board to the inside surface of the card front board after completion of said step of patterning in accordance with said optical recording pattern, and die punching both the front and rear boards to a shape of a card after completion of the of adhering.

Further, there is provided in accordance with further another aspect of the present invention an optical recording card having hologram contained therein comprising a transparent card front board of which inside surface has pattern of concavity and convexity in the form of hologram interference fringe formed at an information recording portion building area, an optical recording pattern layer covering at least a part of the information recording portion building area, a reflective metallic film covering the whole area of the information recording portion building area from the above of the optical recording pattern layer, and a card rear board adapted to be adhered to the card front board from the above of the reflective metallic film.

Further, there is provided in accordance with further another aspect of the present invention a method of producing an optical recording card having hologram contained therein, comprising, the steps of die pressing a pattern of concavity and convexity in the form of hologram interference fringe at an information recording portion building area of a transparent card front board of which inside surface including the information recording portion building area, forming an optical recording layer with the use of a paint or ink at least at a part of the information recording portion building area after completion of said step of die pressing, the paint or ink containing infrared ray absorbing agent or ultraviolet ray absorbing agent and is transparant for visible light, forming a reflective metallic film covering the whole surface of the information recording portion building area from the above of the optical recording pattern layer by vacuum evaporation after completion of the step of forming the optical recording pattern layer, adhereing a card rear board to the inside surface of said card rear board after completion of forming the reflective metallic film, and die punching both of the front and rear boards to a shape of a card after completion of the step of adhering.

Further, there is provided in acoordance with further another aspect of the present invention an optical recording card having hologram contained therein, comprising a transparent card front board of which inside surface includes a hologram portion building area and an optical recording portion building area, the hologram portion building area being formed with a pattern of concavity and convexity in the form of hologram interference fringe of hologram, a reflective metallic film covering the hologram portion building area from the above of the pattern layer of concavity and convexity, an optical recording member covering the optical recording portion building area on the inside surface of the card front board, and a card rear board adapted to be adhered to the card front board from the above of the reflective metallic film and the optical recording member, the latter being composed of an optical recording pattern layer and the reflective metallic film.

Further, there is provided in accordance with further another aspect of the present invention a method of producing an optical recording card having hologram contained therein, comprising the steps of die pressing a pattern of concavity and convexity in the form of hologram interference fringe at the hologram portion building area of the transparent card front board of which inside surface includes the hologram portion building area and an optical recording portion building area forming a optical pattern layer at a part of the optical recording portion building area with the used of a paint or ink which contains infrared ray absorbing agent of ultraviolet ray absorbing agent and is transparent for visible light after completion of the step of die pressing, forming a reflective metallic film covering the whole area the hologram portion building area and the optical recording portion building area by vacuum evaporation after completion of the step of forming said optical pattern.

patterning the reflective mettalic film in accordance with a master pattern at the hologram protion building area after completion of the step of reflective metallic film forming, adhering the card rear board to the inside surface of the card front board after completion of patterning, and die punching both the front and rear board to a shape of a card after completion of the of adhering.

BRIEF DESCRIPTION OF THE DRAWINGS

The present invention will be be illustrated in the following drawing in which.

DESCRIPTION OF THE PREFERRED EMBODIMENTS

Now, the present invention will be described in a greater detail hereunder with reference to the accompanying drawings.

Figure 1:
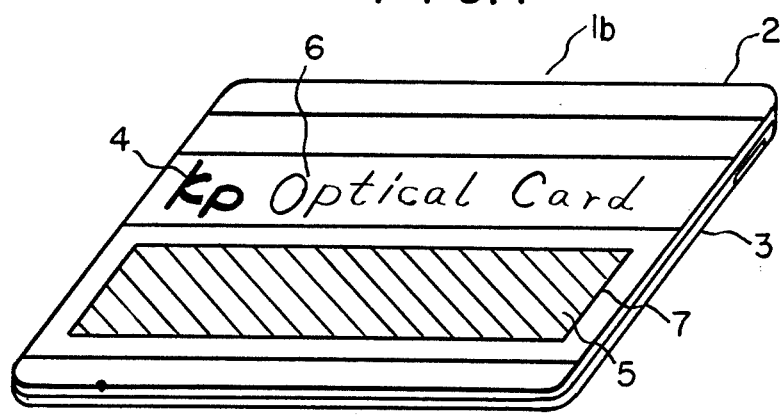
FIG. 1 is a perspective view of an optical recording card 1b having hologram contained there in accordance with the present invention.
Figure 2:
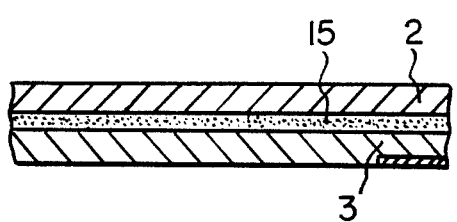
FIG. 2 is a fragmental enlarged side view of an optical recording card 1b having hologram contained therein.

In FIG. 1 and 2, reference number 1b designates an optical recording card having hologram included therein (hereinafter referred to as optical recording card for the purpose of simplification). The optical recording card 1b includes a hologram portion 4 in a hologram portion building area 6 and an optical recording portion 5 in an optical recording portion building area 7 between two card boards, that is, a front board 2 and a rear board 3. The front board 2 is constituted by transparent resin. In particular, the front board 2 is constituted by resin having excellent transparency such as polycarbonate, polymethylmethacrylate, epoxy or the like, while the rear board 3 is constituted by polycarbonate, polymethylmethacrylate, polyvinylchloride, epoxy, polyethyleneterephthalate or the like.

Figure 3:
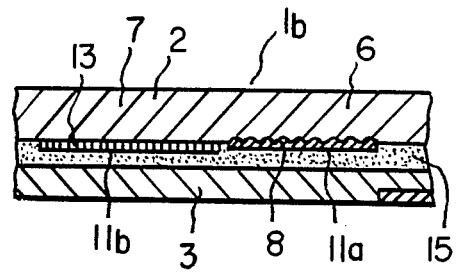
FIG. 3 is a fragmental enlarged side view of the optical recording card 1b having hologram contained therein in accordance with an embodiment of the present invention.
Figure 4:
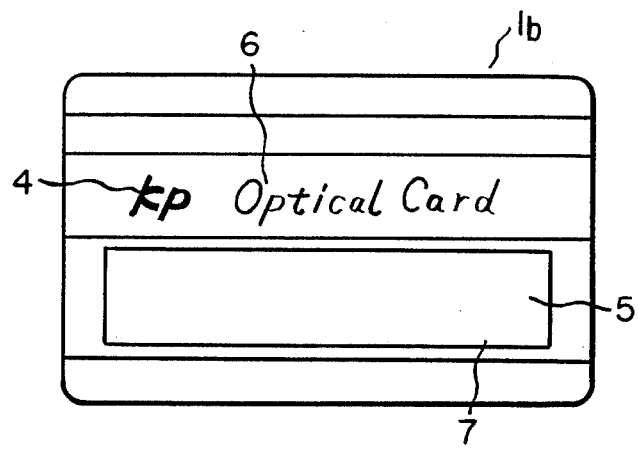
FIG. 4 is a plan view of the optical recording card 1b having hologram contained therein in FIG. 3.

As shown in FIG. 3 and 4, concavity and convexity 8 representing interference fringes of hologram are formed on the rear surface of the front board 2 in the hologram portion building area 6 and moreover the surface of the concavity and convexity is convered with a reflective metallic film 11a made of metallic material such as Al, Au, Ag, Cu, Ni, Te, Bi, or the like.

On the other hand, the inside surface of the front board is covered with an optical recording pattern layer 11b comprising reflective metallic film 11a such as deposited aluminum film in the optical recording portion building area 7. The optical recording pattern layer 11b is formed with a number of optical information pits 13 which are arranged in accordance with a predetermined pattern. No reading light is reflected in the thus formed optical information pits 13 but reading light is reflected at the residual part on the optical recording pattern layer 11b whereby information can be reproduced in dependence on presence and absence of reflected reading light. The surface of the reflective metallic film 11a and the optical recording pattern layer 11b are covered with the rear board 3 with a layer of polyester based or urethane based thermoplastic adhesive 15 interposed therebetween.

When reproduction lightening light is emitted into the hologram portion building area 6 from the surface of the front board of the recording card as constructed in the abovedescribed manner, it is diffracted in several directions due to the presence of the concavity and convexity 8. Among the thus diffracted light there is light wave having the same amplitude and phase as those of wave face of previously recorded light so that recorded image can be reproduced. Similarly, when reading light is emitted into the optical recording portion building area 7 from the surface of the front board 2 and it is then received thereon, the content recorded in the optical recording pattern layer 11b in the optical recording portion building area 7 can be read.

Since the optical recording card 1b as constructed in that way has two recording portions comprising hologram portion 4 and optical recording portion 5, the result is that informations which can be contained in a certification card will have a highly increased density. Further, falsification or alteration of the certification card is achiedved only by working either one or both of the hologram portion 4 and the optical recording portion 5. Since working on one of them results in breakage or damage of the other one and it is almost difficult to treat or process them manually, falsificaition and alteration of the card can be prevented.

Also the reflective metallic film 11a on the hologram portion 4 can be formed by way of the same vacuum deposition steps as those for the optical recording pattern layer 11b comprising reflective metallic film required for optical recording. Thus, in spite of the fact that hologram is added to optical card, the whole structure does not become complecated the number of components is not doubled and similarly the number of stens of producing does not increase in a simple additive manner.

Next, description will be made below as to a method of producing the optical recording card.

Figure 5:
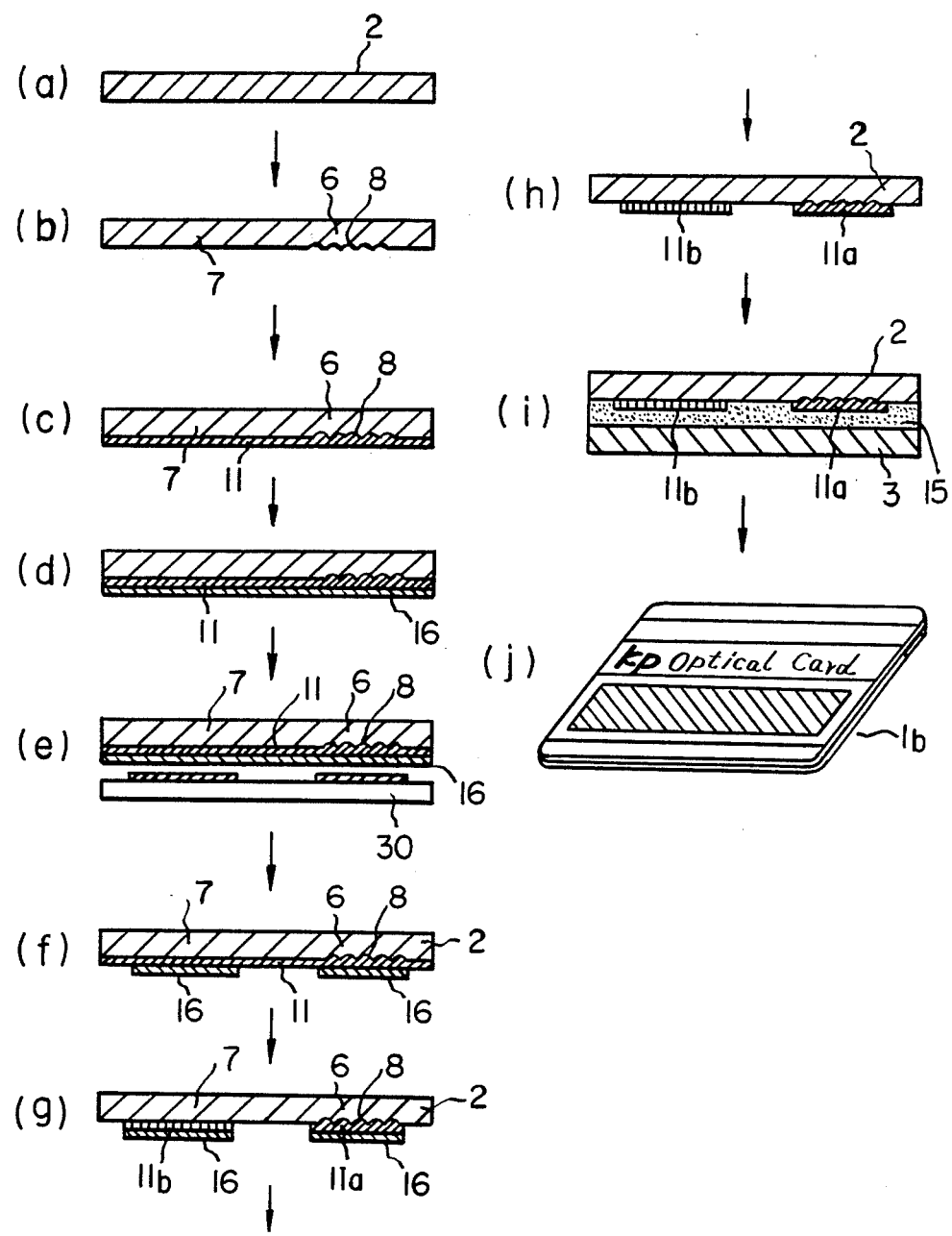
FIGS. 5 (a) to (j) illustrate the steps of producing the optical recording card 1b having hologram contained therein in FIG. 3 respectively.

(1) When the optical recording card 1b as shown in FIGS. 3 and 4 is produced, a front board 2 constituted by transparent thermoplastic resin such as polycarbonate, plymethylmethacrylate (PMMA) or the like is firstly provided as shown in FIG. 5 (FIG. 5(a)).

(2) The concavity and convexity 8 representing interference fringe of hologram are die pressed in the hologram portion building area 6 of the front board 2 under the effect of hot stamping (FIG. 5(b)). It should be noted that the front board having concavity and convexity formed by way of the steps (1) and (2) may be produced by injection molding.

(3) Next, an aluminum film 11 is formed over the hologram portion building area 6 and the optical recording portion building area 7 of the inner surface of the front board 2 by vaccum evaporation under the operative conditions of degree of vacuum of $2 \times 10^{-5}$ Torr and evaporation speed of 20 Å/sec, until the aluminum film has a thickness of 1000 Å (FIG. 5(C)).

Next, the aluminum film 11 on the front board 2 is spin coated with photo resist 16 (MICROPOSIT (R) PHOTO RESIST 1400-17 produced by Shipley Corp.) under the operative conditions of 3000 rpm and 30 sec. and then the thus coated is prebaked in a clean oven at a temperature of 90° C. and for a period of time of 15 min. (FIG. 5(d)).

(5) Next, a required mask 30 is placed on the resist coated aluminum film 11 and it is then exposed to light under the operative condition of 6 mj/cm² (FIG. 5(e)).

(6) Next, the front board 2 is immersed for 40 sec. in a solution which is prepared by diluting developer (MICROPOSIT (R) DEVELOPER MF-312 produced by Shipley Corp.) with $H_2O$ at a ratio of 1:1 so that it is developed. Thereafter, it is washed with water (FIG. 5(f)).

(7) Next, the front board 2 is immersed for 40 sec. at a temperature of 35° C. in a solution which is prepared by mixing an etching liquid ($H_3PO_4 + HNO_3 + CH_3COOH + H_2O$) at a volumetric ratio (16:1:2:1) so that the aluminum film 11 is removed. Thereafter, it is washed with water. Thus, both the hologram portion building area 6 and the optical recording portion building area 7 are subjected to etching simultaneously (FIG. 5(g)).

(8) To facilitate removal the photoresist 16 is subjected to exposing again under the operative condition of 100 mj/cm² and the front board 2 is immersed for 1 sec. in a solution which is prepared by diluting remover (MICROPOSIT (R) REMOVER 1112A produced by Shipley Corp.) with $H_2O$ at a ratio of 1:3. Then, it is washed with water and thereafter it is dried (FIG. 5(h)).

(9) Next, the inner surface of the rear board 3 of polyethyleneterephthalate or the like having a required design placed thereon is previously coated with urethane based thermoplastic adhesive 15 and dried. The inner surface of the front board 2 is superimposed on the thus prepared inner surface of the rear board 3 and they are then subjected to heating and pressing for 10 min. under the operative conditions of 100° C.

and 20 kg/cm². Thus, they are adhered to one another (FIG. 5(i)).

(10) Finally, the thus adhered assembly is cut to an ordinary card shape (FIG. 5(j)).

Thus, the optical recording card 1b is completed by way of the steps as mentioned above.

Since the concavity and convexity 8 are formed directly on the transparent front board 2 to be utilized as structural part for hologram in accordance with the method of producing the optical recording card 1b, a common material can be used and thereby the number of structural components can be reduced. Further, since a reflective metallic film for both the hologram portion and the optical recording portion are formed by common metallic evaporation and common etching, the number of steps of production can be reduced. As a result, the optical recording card can be produced at an inexpensive cost.

Next, discription will be made below as to an optical recording card 1d having hologram contained therein in accordance with other embodiment of the present invention.

Figure 6:
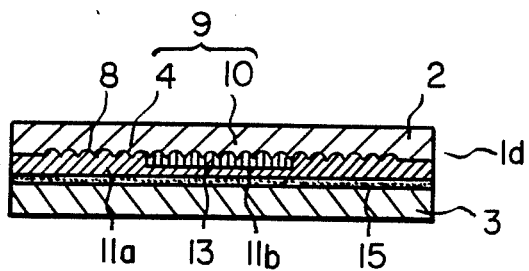
FIG. 6 is an enlarged side view of an optical recording card 1d having hologram contained therein in accordance with other embodiment of the present invention.
Figure 7:
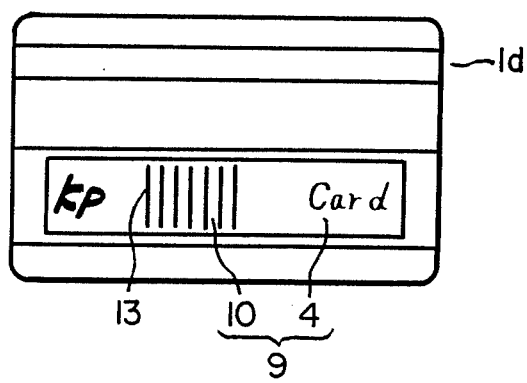
FIG. 7 is a plan view of the optical recording card 1d having hologram contained therein FIG. 6.

In FIG. 6 and 7, reference number 1d designates an optical recording card having hologram included therin (hereinafter referred to as optical recording card for the purpose of simplification). The optical recording card 1d includes an information recording portion building area 9 between two card boards, that is, between the front board 2 and the rear board 3 so that it is composed of a hologram portion 4 and a hologram portion-optical recording portion 10. The front board 2 is constituted by transparent thermoplastic resin such as polycarbonate, polymethylmethacrylate (PMMA) or the like, while the rear board 3 is constituted by resinous material such as polycarbonate, polymethylmethacrylate, polyvinyl chloride, epoxy, polyethyleneterephthalate or the like.

An optical recording pattern layer 11b has a thickness in the range of about 0.1 to 2.0 microns and is constituted by material which is absorptive for invisible light such as infrared ray, ultraviolet ray or the like but is transparent for visible light. Accordingly, the optical recording pattern layer 11b can not be visually recognized by lightening of visual light under the ordinary conditions but optical informations contained in the optical recording pattern layers 11b can be read with the use of a reading machine in which infrared ray or ultraviolet ray is used as light source.

As material constituting the optical recording pattern layer 11b, paint or ink which is prepared by dissolving infrared ray absorbing agent or ultraviolet ray absorbing agent into binder by an amount in the range of 0.01% to 20% is used.

Typical infrared ray absorbing agent is noted below.

| | |
|---|---|
| PA-1005 | (produced by Mitsui Toatsu Chemicals, Inc.) |
| PA-1006 | (produced by Mitsui Toatsu Chemicals, Inc.) |
| IR-750 | (produced by Nippon Kayaku Co,. Ltd.) |
| IR-820 | (produced by Nippon Kayaku Co,. Ltd.) |
| IRG-002 | (produced by Nippon Kayaku Co,. Ltd.) |
| IRG-003 | (produced by Nippon Kayaku Co,. Ltd.) |

Further, typical ultraviolet ray absorbing agent is noted below.

| | |
|---|---|
| Tinuvin | (produced by CIBA-GEIGY Ltd. trade name) |

-continued

| | |
|---|---|
| Uvinul | (produced by General Aniline & Film Corp. trade name) |
| Cyasorb | (produced by American Cyanamid Co. trade name) |

As binder usable for the above-mentioned purpose, the following binder having photosensibility or having no photosensibility is usable.

| | |
|---|---|
| FVR | (transparent photosensitive resin, produced by Fuji Chemicals Co., Ltd.) |
| SEMICOFINE SP-910 | (transparent thermosetting resin, produced by Toray Industries, Inc.) |

As patterning method, photolithography method (in the case of binder having photosensibility), photoetching method (in the case of binder having no photosensibility) and printing method are employable.

The whole area ranging from the optical recording pattern layer 11b to the information recording portion building area 9 is covered with reflective metallic film 11a such as aluminum evaporation film. The surface of the reflective metallic film 11a is covered with the rear board 3 with polyester based or urethane based thermoplastic adhesive 15 interposed therebetween. A reflective type hologram is constituted in cooperation of concavity and convexity 8 on the front board 2 with the reflective metallic film 11a. Accordingly, the hologram portion 4 in the information recording portion building area 9 is constituted by a combination of the concavity and convexity 8 on the front board 2 and the reflective metallic film 11a, while the hologram portion optical recording portion 10 is constituted by a combination of the concavity and convexity 8 on the front board 2, the optical recording pattern layer 11b and the reflective metallic film 11a.

When reproduction lightening light, that is visible, light is emitted into the information recording portion building area 9 from the surface of the front board of the optical recording portion building area, it is diffracted at the concavity and convexity 8 in several directions. Among the thus diffracted light there is some light wave having the same amplitude and phase as those of wave face of light which is previously recorded and this light wave causes the recorded image to be reproduced. At this moment the optical recording pattern layer 11b is transparent relative to visible light and therefore it does not inhibit any image from hologram from being reproduced. Further, at this moment, the optical recording pattern 11b is invisible and therefore it can not be recognized visally when infrared ray or ultraviolet ray acting as reading light is emitted into the hologram portion-optical recording portion 10 and reflected light is received, the content recorded in the light the optical recording pattern layer 11b can be read.

Since the optical recording card 1d is such that both the hologram portion 4 and the hologram portion-optical recording portion 10 are superimposed one above another, information which can be contained in the optical recording card will have a highly increased density. Falsification or alteration of the optical recording card is achieved only by working either or both of the hologram portion 4 and the hologram portion-optical recording portion 10. However, since the hologram portion-optical recording portion 10 is invisible and working on one of them results in breakage and damage of the other one, it is almost difficult to work them manually. Owing to this falsification and alteration of the optical recording card 1d can be prevented.

Next, description will be made below as to how the optical recording card 1d is produced.

Figure 8:
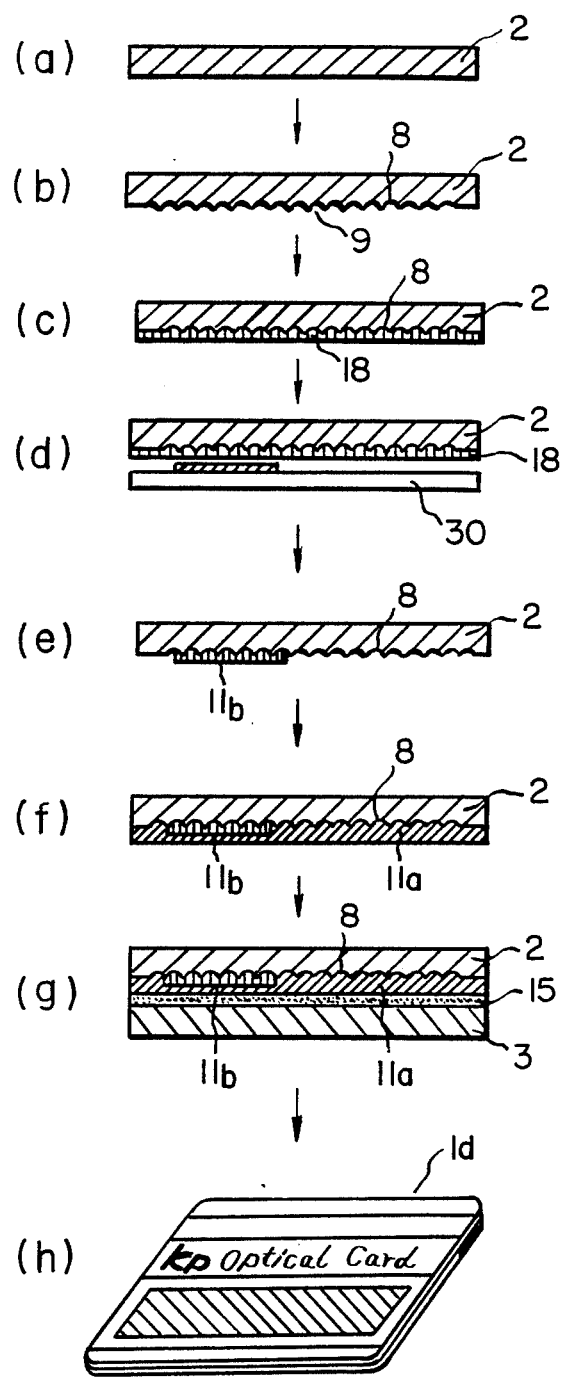
FIGS. 8 (a) to (h) illustrate the steps of producing the optical recording card 1d having hologram contained therein in FIG. 6.

(1) When the optical recording card 1d is to be produced, a front board 2 constituted by transparent thermoplastic resin such as polycarbonate, plymethylmethacrylate or the like is firstly provided as shown in FIG. 8 (FIG. 8 (a)).

(2) The concavity and convexity 8 representing interference fringe of hologram are die pressed in the information recording portion building area 9 under the effect of hot stamping (FIG. 8 (b)). It should be noted that the front board 2 having concavity and convexity 8 formed by way of the steps (1) and (2) may be produced by injection molding.

(3) Next, the front board is roll coated with a solution which is prepared by mixing together 1 g of near-infrared absorbing agent NK-2865 produced by NIPPON KANKOH-SHIKISO KENKYUSHO Co., Lt,., 100 g of photosensitive agent R 100 produced by Fuji Chemicals Industrial Co., Ltd. and 10 g of 10% solution of ammonium dischoromate until a dried film has a thickness of 2 microns (FIG. 8 (c)).

(4) Next, a required mask 30 is placed on the front board 2 and it is then exposed to light under the operative condition of 50 mJ/cm$^2$ (FIG. 8(d)).

(5) Next, the front board 2 is immersed for 60 sec. at a temperature of 35° C. in a liquid of $H_2O$ so that developing is effected. Thereafter, it is subjected to post-baking in a clean oven at a temperature of 120° C. for 30 whereby an optical recording pattern layer 11b is formed (FIG. 8(e)).

(6) Next, an aluminum film 11 is formed over the hologram portion building area 6 and the optical recording portion building area 7 on the optical recording pattern layer 11b by vacuum evaporation under the operative conditions of degree of vacuum of $2 \times 10^{-5}$ Torr and evaporation speed of 20 Å/sec until the aluminum film has a thickness of 1000 Å (FIG. 8(f)).

(7) Next, the inner surface of the rear board 3 of polyesterterephthalate or the like having a required pattern placed thereon is previously coated with urethane based thermoplastic adhesive 15 and dried. The inner surface of the front board 2 is superimposed on the thus prepared inner surface of the rear board 3 and they are then subjected to heating and pressing for 10 min. under the operative conditions of 100° C. and 20 kg/cm$^2$. (FIG. 8(g)).

(8) Finally, the thus adhered assembly is cut to an ordinary card shape (FIG. 8(h)).

Thus, the optical recording card 1d is completed by way of the steps as mentioned above.

Since the concavity and convexity 8 are formed directly on the transparent front board 2 to be utilized as structural part for hologram in accordance with the method of producing the optical recording card 1d as constructed in that way, the concavity and convexity 8 are formed directly on the transparent front board 2 to be utilized as structural part for hologram, a common material can be used and thereby the number of structural components as well as the number of steps of productin can be reduced. As a result, the optical recording card can be advantageously produced at an inexpensive cost.

Next, description will be made below as to an optical recording card 1e having hologram contained therein in accordance with another embodiment of the present invention.

Figure 9:
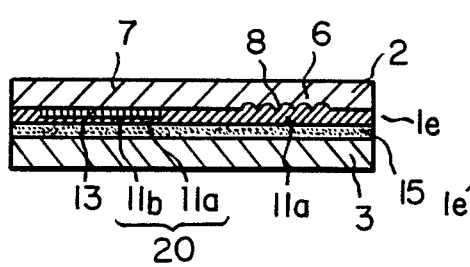
FIG. 9 is an enlarged side view of an optical recording card 1e having hologram contained therein in accordance with another embodiment of the present invention.
Figure 10:
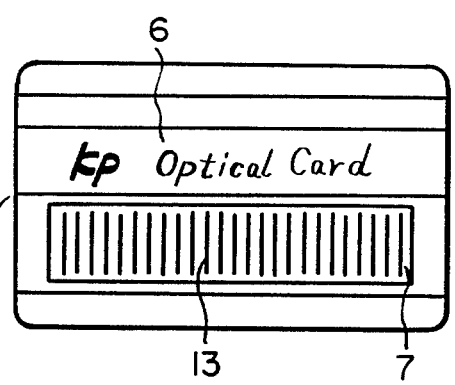
FIG. 10 is a plan view of the optical recording card having hologram contained therein in FIG. 9.

In FIG. 9 and 10 reference numeral 1e designates an optical recording card having hologram contained therein (hereinafter referred to as optical recording card for the purpose of simplification). The optical recording card 1e includes a hologram portion building area 6 and an optical recording portion building area 7 between two card boards, that is, between the front board 2 and the rear board 3. The front board 2 is constituted by transparent thermoplastic resin such as polycarbonate, polymethylmethacrylate or the like, while the rear board 3 is constituted by resinous material such as polycarbonate, polymethylmethacrylate, polyvinylchloride, epoxy, polyethyleneterephthalate or the like.

Concavity and convexity 8 representing interference fringe are formed on the inside surface of the front board 2 in the hologram portion building area 6. The optical recording portion building area 7 is covered with an optical recording member 20. The optical recording member 20 is constituted by an optical recording pattern layer 11b and a reflective metallic film 11a. The optical recording pattern 11b is constituted by material which is absorptive for invisible light such as infrared ray or ultraviolet ray and is transparent for visible light. In the case where the optical recording pattern layer 11b is constituted by material which is absorptive for infrared ray or ultraviolet ray, it can not be visually recognized by lightening of visual light under the ordinary conditions but optical informations contained in the optical recording pattern layer 11b can be read by means of a reading machine which employes infrared ray of ultraviolet ray as reading light.

Material constituting such an invisible optical recording pattern layer 11b is identical to infrared ray absorbing agent or ultraviolet absorbing agent which was used for the optical recording card 1d.

The whole area including the hologram portion building area 6 and the optical recording portion building area 7 on the optical recording pattern layer 11b is covered with reflective metallic film 11a like aluminum vacuum evaporation film. The surface of the reflective metallic film 11a is covered with the rear board 3 with a layer of polyester based or urethane based thermoplastic adhesive 15 interposed therebetween. The concavity and convexity 8 and the reflective metallic film 11a on the front board 2 build reflective type hologram in cooperation with one another. Accordingly, the hologram portion building 6 area constituted by the concavity and convexity 8 and the reflective metallic film 11a on the front board 2, while the optical recording portion building area 7 is constituted by the optical recording pattern layer 11b and the reflective metallic film 11a.

Figure 12:
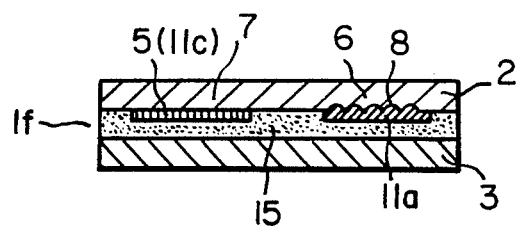
FIG. 12 is an enlarged side view of an optical recording card having hologram contained therein in accordance with further another embodiment of the present invention.

Incidentally, as shown in FIG. 12, an optical recording card 1f including hologram contained therein may be constituted by forming reflective metallic film 11a and then by forming optical recording pattern layer 11c using material such as infrared ray absorbing agent, ultraviolet ray absorbing agent or the like which is absorptive for invisible light and transparent for visible light.

Next, description will be made below as to a method of producing the optical recording card 1e.

Figure 11:
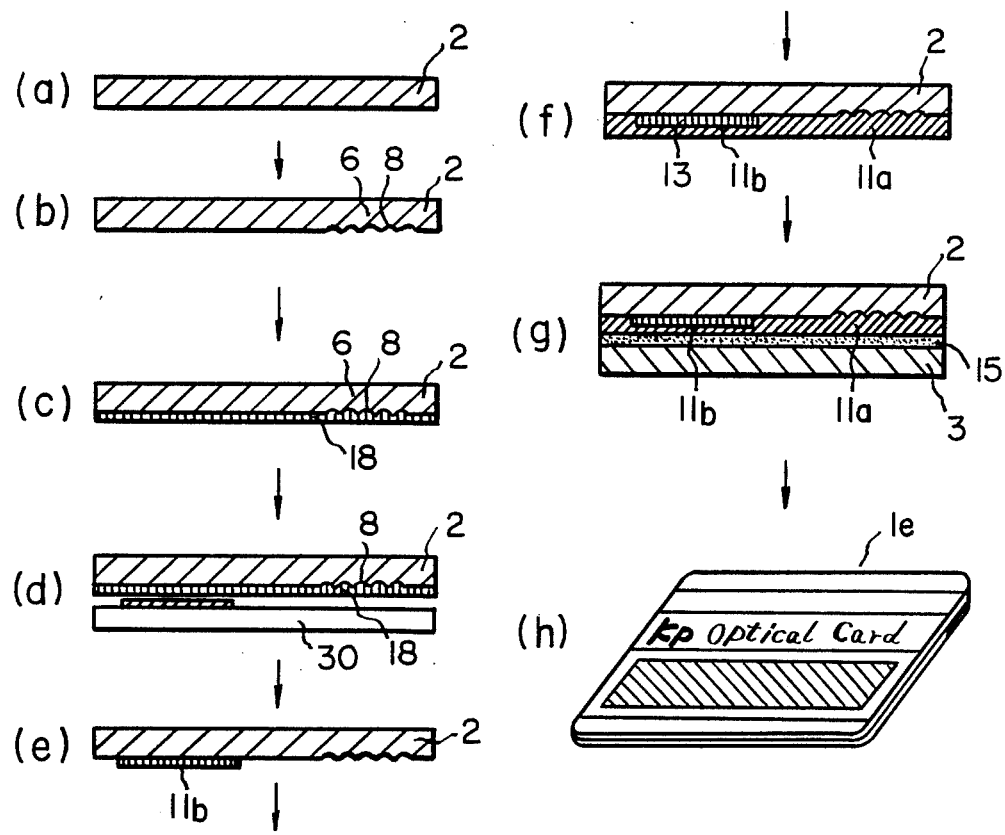
FIGS. 11 (a) to (h) illustrate the steps of producing the optical recording card having hologram therein in FIG. 9.

(1) When the optical recording card 1e is to be produced, a front board 2 made of transparent thermoplastic resin such as polycarbonate, polymethylmethacrylate (PMMA) or the like is firstly prepared as shown in FIG. 11 (FIG. 11(a)).

(2) Concavity and convexity 8 representing interference fringe hologram is die pressed in the hologram portion building area 6 on the front board 2 under the effect of a hot stamping (FIG. 11(b)). Incidentally, the front board 2 having the concavity and convexity 8 obtained by way of the steps (1) and (2) may be produced by injection molding.

(3) Next, the front board is roll coated with a solution 10 which is prepared by mixing together 1g of near-infrared absorbing agent NK-2865 produced by NIPPON KANKOH-SHIKISO KENKYUSHO Co., Ltd., 100 of photosensitive agent R100 produced by Fuji Chemicals Industrial Co., Ltd. and 10 g of 10% solusion of ammonium dichromate until a dried film has a thickness of 2 microns (FIG. 11(c)).

(4) Next, a required mask 30 is placed on the front board 2 and it is then exposed to light under the operative condition of 50 mJ/cm$^2$ (FIG. 11(d)).

(5) Next, the front board 2 is immersed for 60 sec. at a temperature of 35° C. in a liquid of $H_2O$ so that developing is effected. Thereafter, it is subjected to post-baking in a clean oven at a temperature of 120° C. for 30 min. whereby an optical recording pattern layer 11b is formed (FIG. 11(e)).

(6) Next, an aluminum film 11 is formed over the hologram portion building area 6 and the optical recording portion building area 7 on the optical recording pattern layer 11b by vacuum evaporation under the operative conditions of degree of vacuum of $2 \times 10^{-5}$ Torr and evaporation speed of 20 Å/sec until the aluminum film has a thickness of 1000 Å (FIG. 11(f)).

(7) Next, the inner surface of the rear board 3 of polyesterephthalate or the like having a required design placed thereon is previously coated with urethane based thermoplastic adhesive 15 and dried. The inner surface of the front board 2 is superimposed on the thus prepared inner surface of the rear board 3 and they are then subjected to heating and pressing for 10 min. under the operative conditions of 100° C. and 20 kg/cm$^2$. (FIG. 11(g)).

(8) Finally, the thus adhered assembly is cut to an ordinary card shape (FIG. 11(h)).

Thus, the optical recording card 1e is completed by way of the steps as mentioned above.

When reproduction lightening light, that is, visual light is emitted into the hologram portion building area 6 from the surface of the front board 2 of the optical recording card 1e as constructed in the above-described manner, it is diffracted in several directions due to the presence of the concavity and convexity 8. Among the thus diffracted light there is light wave having the same amplitude and phase as those of wave face of previously recorded light so that the recorded image can be reproduced.

In the case where the optical recording pattern layer 11b is constituted by material which is absorptive for infrared ray or ultraviolet ray, it can not be visually recognized because it is transparent for visual light. However, when infrared ray or ultraviolet ray is emitted thereinto and reflected light is then received, the content recorded in the optical recording pattern layer 11b can be read.

Since the optical recording card 1e as constructed in that way has both the recording area comprising the hologram portion building area 6 and the optical recording portion building area 7, the result is that information which can be contained in a certification card will have a highly increased density. Further, falsification or alteration of the certification card is achieved only by working either one or both of the hologram portion building area 6 and the optical recording portion building area 7. Since wording on one of them results in breakage or damage of the other one and it is almost difficult to treat or process them manually, falsification and alteration of the card can be prevented. Thus, in spite of the fact that hologram is added to the optical recording card, the whole structure does not become complicated, the number of components is not doubled and similarly, the number of steps of producing does not increase in a simply additive manner. Moreover, this makes it difficult to achieve falsification and alteration of a card of this kind.

What is claimed is:

1. An optical recording card having hologram contained therein comprising a transparent card front board of which inside surface includes a hologram portion building area and an optical recording portion building area superposed on said hologram portion building area, said hologram portion building area being formed with a pattern of concavity and convexity in the form of interference fringe of hologram, a reflective metallic film covering said pattern of concavity and convexity, said optical recording area including an optical recording pattern layer disposed between said reflective film and said pattern of concavity and convexity, said recording layer comprising a light absorbing material for frequencies outside the visible spectrum and a card rear board adapted to be adhered to said card front board from the above of said reflective metallic film and said optical recording pattern layer.

2. An optical recording card having hologram contained therein as claimed in claim 1, wherein said card front board is constituted by thermoplastic resin such as polycarbonate, polymethylacrylated or the like.

3. An optical recording card having hologram contained therein as claimed in claim 2, wherein said reflective metallic film comprises an aluminum evaporation film.

4. An optical recording card having hologram contained therein comprising a transparent card front board of which inside surface has pattern of concavity and convexity in the form of hologram interference fring formed at an information recording portion building area, an optical recording pattern layer covering at least a part of said information recording portion building area, a reflective metallic film covering the whole area of the information recording portion building area from above of said optical recording pattern layer, and a card rear board adapted to be adhered to said card front board from the above of said reflective metallic film, said optical recording pattern layer has a thickness in range of 0.1 to 2.0 microns and being constituted by paint or ink which contains infrared ray absorbing agent or ultraviolet ray absorbing agent in the range of 0.01% to 20% and is transparent for visible light, and said optical recording pattern layer being superposed upon said hologram interference fringe.

5. An optical recording card having hologram contained therein as claimed in claim 4, wherein said optical recording pattern layer is constituted by paint or ink which contains infrared ray absorbing agent or ultraviolet ray absorbing agent in the range of 0.01% to 20%.

6. An optical recording card having hologram contained therein as defined in claim 4, wherein said card front board is constituted by thermoplastic resin such as polycarbonate or polymethylmethacrylate.

7. An optical recording card having hologram contained therein as defined in claim 4, wherein said reflective metallic film comprises an aluminum evaporation film.

8. An optical recording card having hologram contained therein, comprising a transparent card front board of which inside surface includes a hologram portion building area and an optical recording portion building area superposed on said hologram portion building area, said hologram portion building area being formed with a pattern of concavity and convexity in the form of hologram interference fringe of hologram, a reflective metallic film covering said hologram portion building area from above of said pattern layer of concavity and convexity, said recording building area having an optical recording member disposed on the inside surface of said card front board, and a card rear board adapted to be adhered to said card front board from the above of said reflective metallic film and said optical recording member, the latter being composed of an optical recording pattern layer and said reflective metallic film, said optical recording pattern layer being constituted by paint or ink which is absorptive for invisible light such as infrared ray or ultraviolet ray and is transparent for visible light.

9. An optical recording card having hologram contained therein as claimed in claim 8, wherein said optical recording pattern layer is constituted by paint or ink which contains infrared ray absorbing agent or ultraviolet ray absorbing agent in the range 0.01% to 20%.

10. An optical recording card having hologram contained therein ad defined in claim 8, wherein said card front board is constituted by thermoplastic resin such as polycarbonate, polymethylmethacrylate or the like.

11. An optical recording card having hologram contained therein as defined in claim 8, wherein said reflective metallic film comprises an aluminum evaporation film.

* * * * *